(12) United States Patent
Komiyama

(10) Patent No.: US 9,024,481 B2
(45) Date of Patent: May 5, 2015

(54) WIRELESS FEEDING SYSTEM

(75) Inventor: Shinji Komiyama, Saitama (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 13/185,087

(22) Filed: Jul. 18, 2011

(65) Prior Publication Data

US 2012/0025626 A1    Feb. 2, 2012

(30) Foreign Application Priority Data

Jul. 30, 2010    (JP) ................................ 2010-172003

(51) Int. Cl.
| | |
|---|---|
| H01F 27/42 | (2006.01) |
| H01F 37/00 | (2006.01) |
| H01F 38/00 | (2006.01) |
| H02J 17/00 | (2006.01) |
| H02J 5/00 | (2006.01) |
| H02J 7/02 | (2006.01) |

(52) U.S. Cl.
CPC ............. *H02J 17/00* (2013.01); *H02J 5/005* (2013.01); *H02J 7/025* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 5,374,930 | A * | 12/1994 | Schuermann | 342/42 |
| 8,421,274 | B2 * | 4/2013 | Sun et al. | 307/104 |
| 2009/0243397 | A1 * | 10/2009 | Cook et al. | 307/104 |
| 2010/0065352 | A1 * | 3/2010 | Ichikawa | 180/65.8 |
| 2010/0109443 | A1 * | 5/2010 | Cook et al. | 307/104 |
| 2010/0184371 | A1 * | 7/2010 | Cook et al. | 455/41.1 |
| 2010/0244580 | A1 * | 9/2010 | Uchida et al. | 307/104 |
| 2010/0259108 | A1 * | 10/2010 | Giler et al. | 307/104 |
| 2012/0262004 | A1 * | 10/2012 | Cook et al. | 307/104 |

FOREIGN PATENT DOCUMENTS

| | | |
|---|---|---|
| CN | 101771297 | 7/2010 |
| JP | 2001-185939 | 7/2001 |

(Continued)

OTHER PUBLICATIONS

Japanese Office Examination Report issued in connection with related Japanese Patent Application No. JP 2010-172003 dated May 7, 2014.

(Continued)

*Primary Examiner* — Rexford Barnie
*Assistant Examiner* — Rasem Mourad
(74) *Attorney, Agent, or Firm* — Dentons US LLP

(57) ABSTRACT

The present disclosure provides a wireless feeding system including: a feeding device; and a power receiving device receiving power transmitted from the feeding device; wherein the feeding device includes a power generating section generating the power to be fed, and a resonant element fed with the power generated by the power generating section, the power receiving device includes a power receiving element receiving the power transmitted from the feeding device, and supplies power according to the received power to a load, and at least one of a power propagation path to the resonant element in the feeding device and a received power propagation path in the power receiving device has a frequency characteristic correcting circuit achieving a wider band by expanding a frequency characteristic while maintaining a Q-value as high sharpness of resonance of the power.

8 Claims, 15 Drawing Sheets

(56) References Cited

FOREIGN PATENT DOCUMENTS

| JP | 2001-238372 | 8/2001 |
|----|-------------|--------|
| JP | 2001-339327 | 12/2001 |
| JP | 2010-011654 | 1/2010 |
| JP | 2010-051137 | 3/2010 |
| JP | 2010-154700 | 7/2010 |
| JP | 2010-069299 | 10/2011 |
| JP | 2011-205757 | 10/2011 |
| WO | WO/2009/023155 A2 | 2/2009 |

OTHER PUBLICATIONS

Japanese Office Examination issued in connection with related Japanese Patent Application No. 2010-172003 dated Jul. 22, 2014.
Chinese Office Examination issued in connection with related Chinese patent application No. CN201110216863.9 dated Aug. 18, 2014.

* cited by examiner

| TRANSMISSION DISTANCE [mm] | TRANSMISSION LOSS [dB] | FREQUENCY [MHz] |
|---|---|---|
| 10 | -0.22 | 13.0 |
| 30 | -0.26 | 12.9 |
| 50 | -0.64 | 12.8 |
| 100 | -4.13 | 12.8 |

| TRANSMISSION DISTANCE [mm] | TRANSMISSION LOSS [dB] | FREQUENCY [MHz] |
|---|---|---|
| 100 | -0.21 | 13.4 |
| 50 | -6.45 | 13.4 |

| TRANSMISSION DISTANCE [mm] | TRANSMISSION LOSS [dB] | FREQUENCY [MHz] |
|---|---|---|
| 5 | -0.99 | 0.7 |
| 10 | -4.22 | 0.7 |
| 50 | -10.40 | 0.3 |

WIRELESS FEEDING SYSTEM

BACKGROUND

The present disclosure relates to a wireless feeding system of a noncontact feeding system in which power is supplied and received on a noncontact (wireless) basis.

An electromagnetic induction system is known as a system for supplying power on a wireless (radio) basis.

In addition, a wireless feeding and charging system using a system referred to as a magnetic field resonance system utilizing an electromagnetic resonance phenomenon has recently been drawing attention.

In the case of the noncontact feeding system of the electromagnetic induction system already used widely now, a magnetic flux needs to be shared between a feeding source and a feeding destination (power receiving side), the feeding source and the feeding destination need to be disposed in very close proximity to each other to transmit power efficiently, and a coupling axial alignment is also important.

On the other hand, the noncontact feeding system using the electromagnetic resonance phenomenon has advantages of enabling power transmission at a longer distance than the electromagnetic induction system and not decreasing transmission efficiency very much even when axial alignment is somewhat poor, due to the principles of the electromagnetic resonance phenomenon.

Incidentally, in addition to the magnetic field resonance system, there is an electric field resonance system utilizing the electromagnetic resonance phenomenon.

Japanese Patent Laid-Open No. 2001-185939 (hereinafter referred to as Patent Document 1), for example, discloses a wireless feeding system employing the magnetic field resonance system.

According to the technique disclosed in Patent Document 1, power is transmitted from a feeding coil connected to a feeding circuit to a resonant coil by electromagnetic induction, and frequency adjustment is made by a capacitor and a resistance connected to the resonant coil.

There has recently been a report on a radio power transmission technique that has achieved transmission of a power of 60 W at a distance of 2 m using the magnetic field resonance system utilizing the resonance phenomenon of a magnetic field.

In addition, there has been a report on the development of a highly efficient "wireless feeding system" that transmits a power of 60 W using the magnetic field resonance system and which drives an electronic device at a distance of 50 cm.

This radio power transmission technology enables radio power transmission of a few 10 W at a distance of a few m, and is thus expected to be applied to new concept products for use in offices and households.

SUMMARY

However, a magnetic field resonance type wireless feeding system transmits power with a high degree of efficiency by picking up a magnetic flux generated from a transmitting coil (resonant coil) forming a resonator by a coupling coil on a receiving side, and enables power transmission for a distance corresponding to about ½ of the diameter of the transmitting and receiving coils.

This is a large value as compared with the transmission distance of the electromagnetic induction system (1/10 to 1/7 of the diameter of the transmitting and receiving coils).

Transmission for such a long distance is achieved by utilizing a "very sharp resonance phenomenon." In order to lengthen the transmission distance, it suffices to improve the characteristics of the resonator by increasing "sharpness of resonance (Q-value)."

A high Q-value as viewed in a frequency domain means a steep frequency characteristic, and is in trade-off relation to a bandwidth.

Thus obtaining a high Q-value invites, as side effects thereof, a narrower band and a sharp decrease in energy transfer efficiency due to a frequency shift or the like. Further, specifically, thus obtaining a high Q-value further leads to the following disadvantages.

When the frequency of a carrier is shifted, transmission efficiency is lowered significantly.

When the resonance frequency of the resonator is shifted due to a change in an ambient environment or a change in temperature, transmission efficiency is lowered significantly.

Power cannot be transmitted at frequencies other than a resonance point. Hence, when power is to be transmitted at other than a resonance frequency set in advance, the resonance frequency needs to be changed. Accordingly, a change in some constant setting becomes necessary. Then, complexity is increased in terms of a mechanism, and electrical characteristics are degraded (such as a decrease in the Q-value of the resonator).

Data can be superimposed by applying modulation to a carrier for power transmission. In this case, a data transfer rate and an occupied bandwidth are in proportional relation to each other in phase modulation and frequency modulation having a high degree of noise immunity. It is therefore difficult to make high-speed data transmission when a transmission bandwidth is narrow.

It is desirable to provide a wireless feeding system capable of achieving a wider band by expanding a frequency characteristic while maintaining high sharpness of resonance (Q-value).

According to a first viewpoint of the present disclosure, there is provided a wireless feeding system including: a feeding device; and a power receiving device receiving power transmitted from the feeding device; wherein the feeding device includes a power generating section generating the power to be fed, and a resonant element fed with the power generated by the power generating section, the power receiving device includes a power receiving element receiving the power transmitted from the feeding device, and supplies power according to the received power to a load, and at least one of a power propagation path to the resonant element in the feeding device and a received power propagation path in the power receiving device has a frequency characteristic correcting circuit achieving a wider band by expanding a frequency characteristic while maintaining a high Q-value (sharpness of resonance).

According to the present disclosure, it is possible to achieve a wider band by expanding a frequency characteristic while maintaining a high sharpness of resonance (Q-value).

DETAILED DESCRIPTION OF THE PREFERRED EMBODIMENTS

Preferred embodiments of the present disclosure will hereinafter be described with reference to the drawings.

Incidentally, description will be made in the following order.
1. First Embodiment (First Example of Configuration of Wireless Feeding System)
2. Second Embodiment (Second Example of Configuration of Wireless Feeding System)
3. Third Embodiment (Application of Wireless Feeding System)

1. First Embodiment

Figure 1:
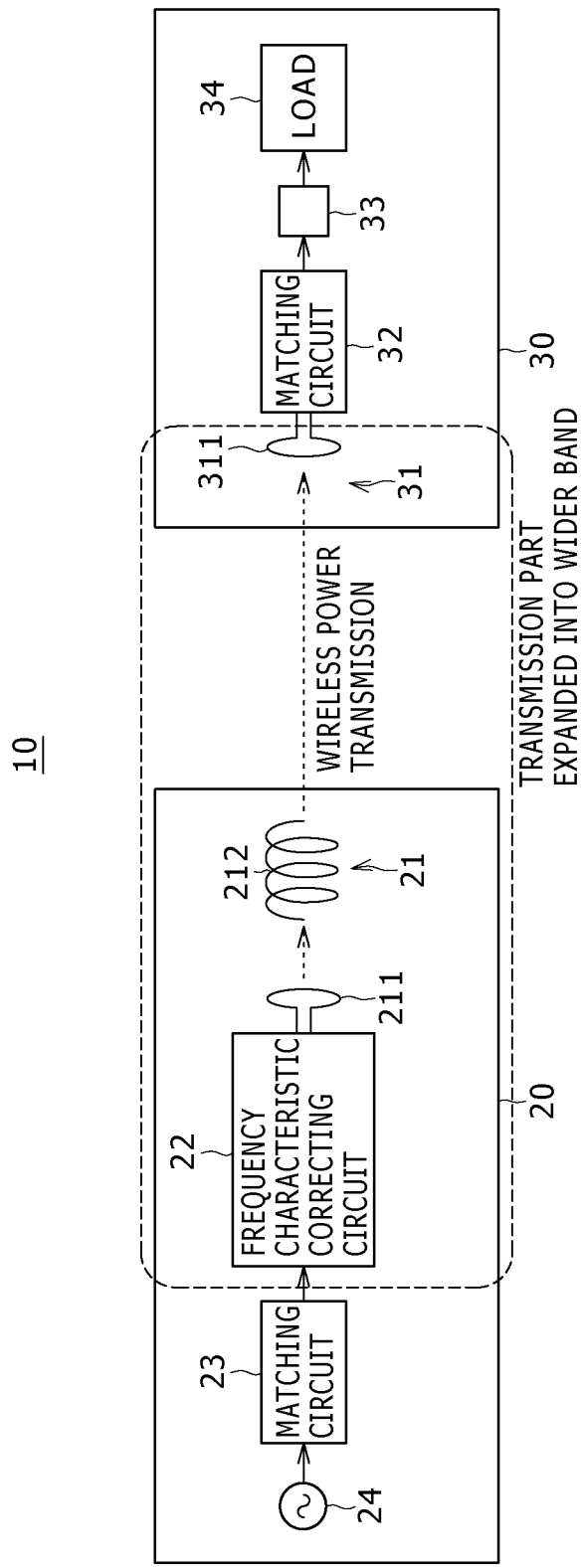
FIG. 1 is a block diagram showing an example of configuration of a wireless feeding system according to an embodiment of the present disclosure.

FIG. 1 is a block diagram showing an example of configuration of a wireless feeding system according to a first embodiment of the present disclosure.

Figure 2:
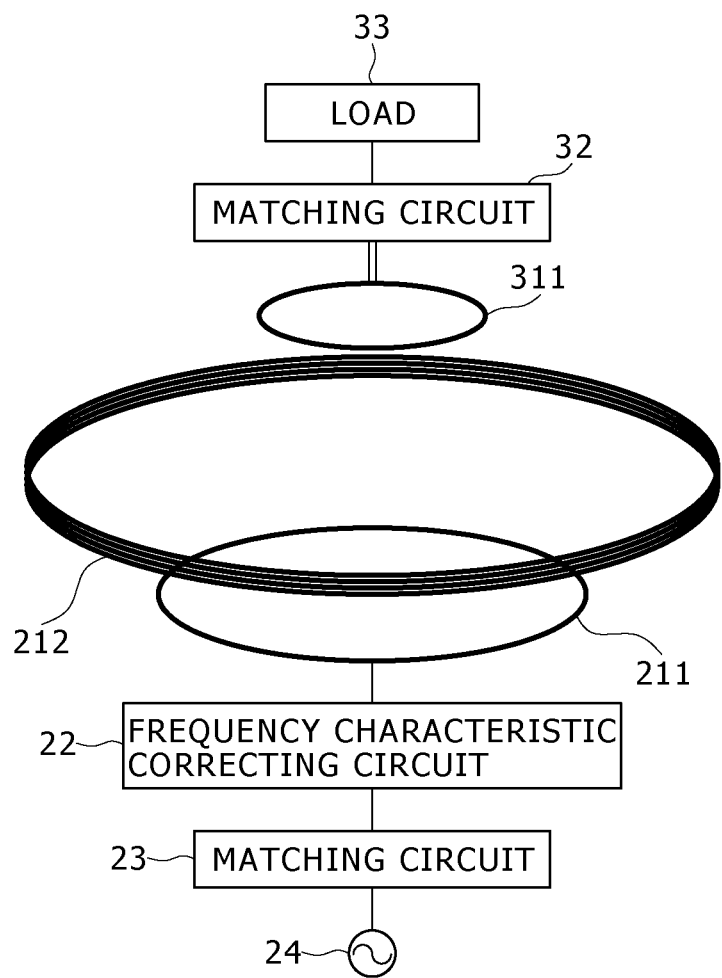
FIG. 2 is a diagram schematically showing relation between a power transmitting side coil and a power receiving side coil of the wireless feeding system according to the embodiment of the present disclosure.

FIG. 2 is a diagram schematically showing relation between a power transmitting side coil and a power receiving side coil of the wireless feeding system according to the first embodiment of the present disclosure.

The present wireless feeding system 10 is formed as a power transmission system.

The present wireless feeding system 10 has a feeding device 20 and a power receiving device 30.

The feeding device 20 includes a power transmitting coil section 21, a frequency characteristic correcting circuit 22, a matching circuit 23, and a high-frequency power generating section (high-frequency power supply: an oscillator) 24.

The power transmitting coil section 21 has a feeding coil 211 as a feeding element and a resonant coil 212 as a resonant element.

The resonant (kyoshin) coil is referred to also as a resonant (kyomei) coil. However, in the present embodiment, the resonant coil will be referred to as a resonant (kyoshin) coil.

The feeding coil 211 is formed by a loop coil fed with an alternating current (AC).

The resonant coil 212 is formed by an air-core coil coupled to the feeding coil 211 by electromagnetic induction. The resonant coil 212 transmits the AC power fed by the feeding coil 211 efficiently on a wireless basis.

Incidentally, the feeding coil 211 and the resonant coil 212 are strongly coupled to each other by electromagnetic induction on a feeding side.

The frequency characteristic correcting circuit 22 achieves a wider band by expanding a frequency characteristic while maintaining a high Q-value of the power to be transmitted which power is supplied through the matching circuit 23. The frequency characteristic correcting circuit 22 is coupled to the feeding coil 211 of the power transmitting coil section 21.

A frequency characteristic correction in the frequency characteristic correcting circuit 22 is made by inserting an appropriately designed resonant circuit into an input path to a resonator.

FIGS. 3A to 3D and FIGS. 4A to 4C are diagrams showing concrete examples of constitution of the coupling circuit section of the frequency characteristic correcting circuit according to the present embodiment.

The frequency characteristic correcting circuit 22 basically includes an LC resonant circuit 221 for frequency characteristic correction and an LC resonator 222 for feeding (transmission).

Figure 3A:
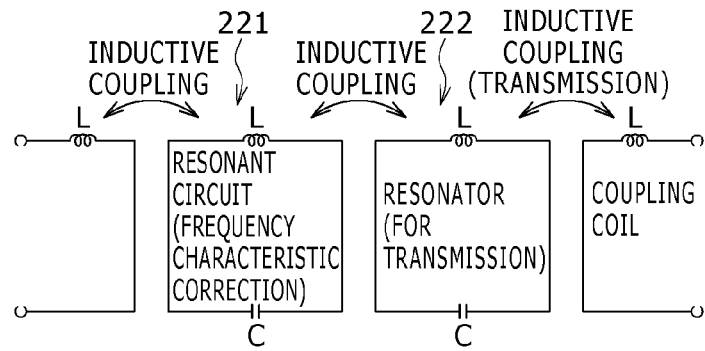
FIGS. 3A, 3B, 3C, and 3D are first diagrams showing concrete examples of constitution of a coupling circuit section of a frequency characteristic correcting circuit according to the present embodiment.

FIG. 3A shows an example in which the newly added resonant circuit 221 is inductively coupled to the resonator.

Figure 3B:
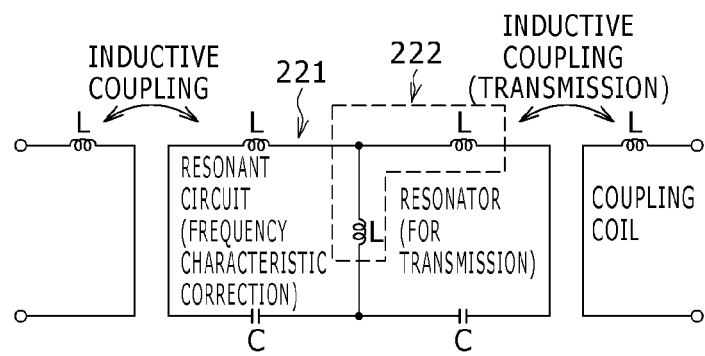

FIG. 3B shows an example in which coupling is provided by a common inductance.

Figure 3C:
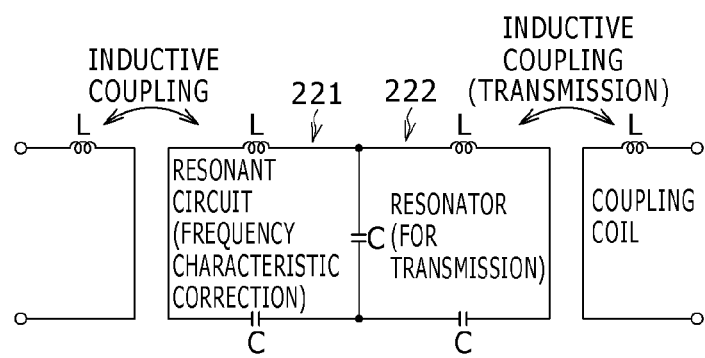

FIG. 3C shows an example in which coupling is provided by a common capacitance.

Figure 3D:
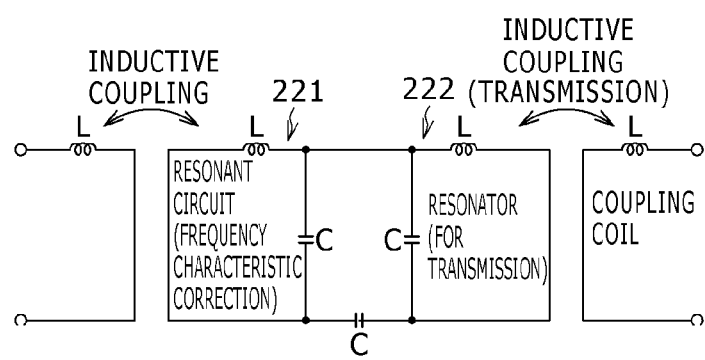

FIG. 3D shows an example in which capacitive coupling is provided.

Figure 4A:
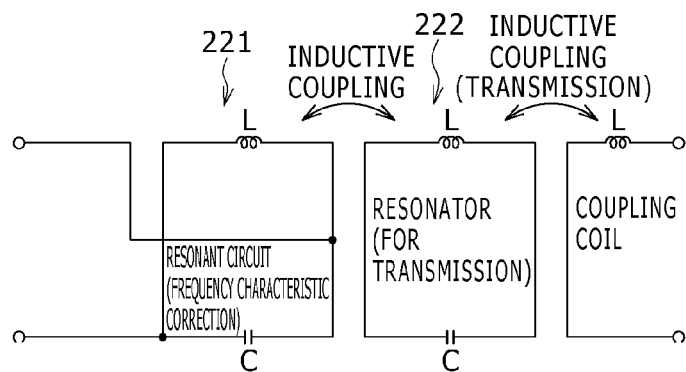
FIGS. 4A, 4B, and 4C are second diagrams showing concrete examples of constitution of the coupling circuit section of the frequency characteristic correcting circuit according to the present embodiment.
Figure 4B:
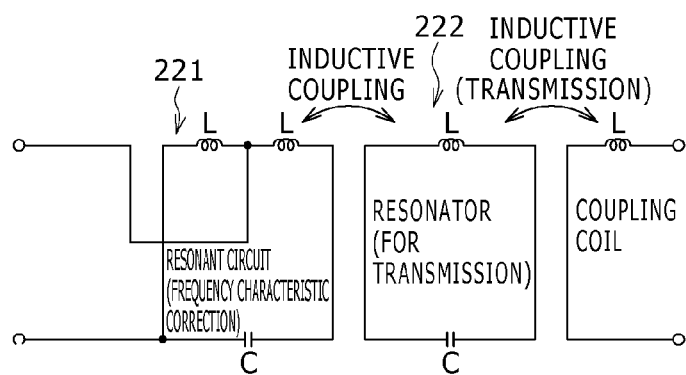
Figure 4C:
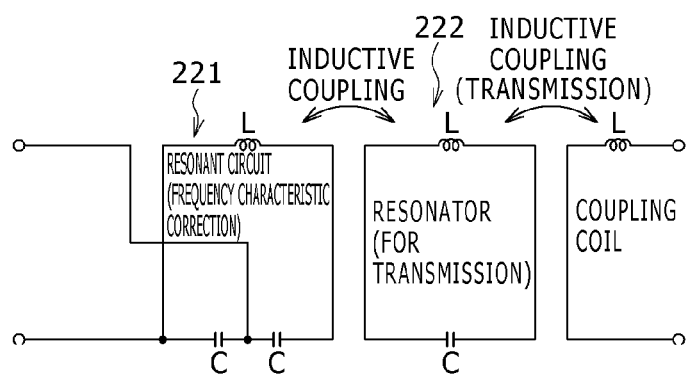

FIGS. 4A to 4C also show variations of a circuit of an input section of the frequency characteristic correcting circuit 22 when the two resonators are inductively coupled to each other.

FIG. 4A shows an example of direct connection (full tap).

FIG. 4B shows an example in which a tap is taken by a coil and impedance conversion is made.

FIG. 4C shows an example in which a tap is taken by a capacitance and impedance conversion is made.

Incidentally, inductors L and capacitors C in the circuit diagrams of FIGS. 3A to 3D and FIGS. 4A to 4C can be formed with a lumped constant, or may be formed with a distributed constant using a printed circuit board or the like.

In addition, a tap may be taken from the resonator 222 for transmission so that the resonator 222 for transmission serves also as the frequency characteristic correcting circuit. For example, there is a mode in which a broken-line part in FIG. 3B is formed by the resonator 222 for transmission.

In addition, while FIGS. 3A to 3D and FIGS. 4A to 4C show only examples having one resonant circuit 221 for frequency characteristic correction, a plurality of resonant circuits may be inserted to increase the number of stages (not shown). A more precise frequency characteristic can be produced by the increase to multiple stages.

Figure 5A:
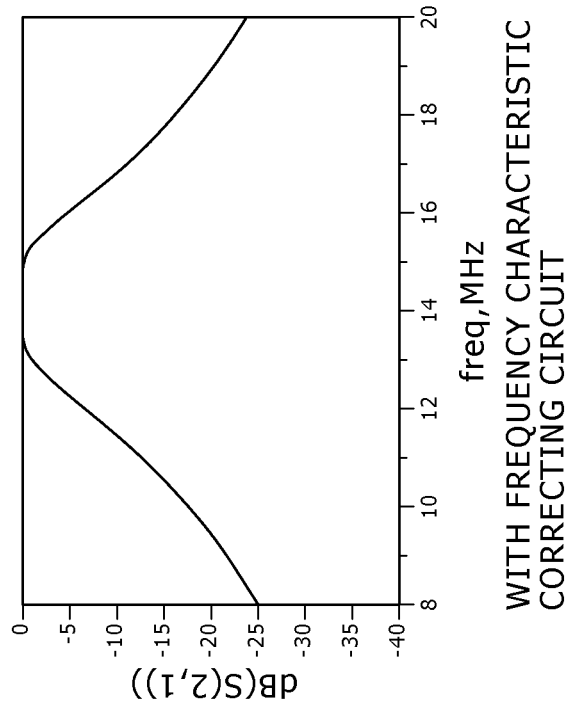
FIGS. 5A and 5B are diagrams showing an example of transmission characteristics (simulation values) in a case where an appropriately designed frequency characteristic correcting circuit is inserted and a case where there is no correcting circuit.
Figure 5B:
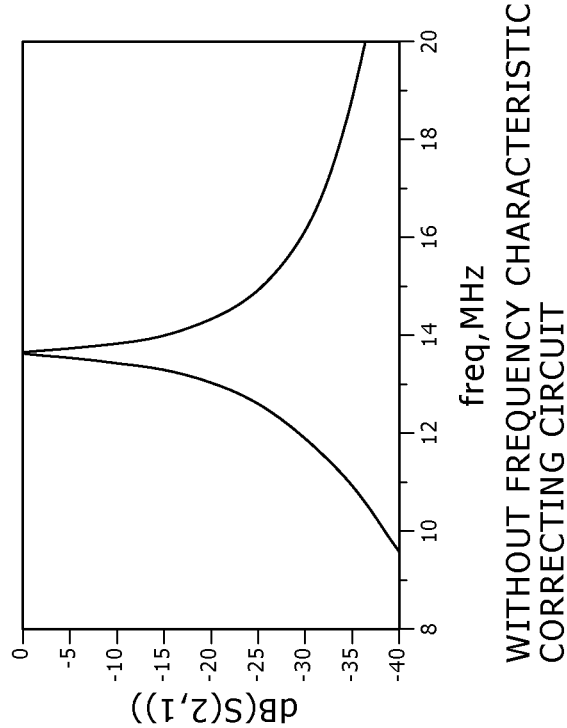

FIGS. 5A and 5B are diagrams showing an example of transmission characteristics (simulation values) in a case where an appropriately designed frequency characteristic correcting circuit is inserted and a case where there is no correcting circuit.

FIG. 5A shows the transmission characteristic in the case where no frequency characteristic correcting circuit is inserted. FIG. 5B shows the transmission characteristic in the case where the frequency characteristic correcting circuit is inserted.

As is understood from FIGS. 5A and 5B, a transmission bandwidth can be widened by inserting the frequency characteristic correcting circuit 22.

The matching circuit 23 makes impedance adjustment (matching) at a feeding point of the feeding coil of the power transmitting coil section 21.

The high-frequency power generating section 24 generates high-frequency power (AC power) for wireless power transmission.

The high-frequency power generated by the high-frequency power generating section 24 is fed (applied) to the feeding coil 211 of the power transmitting coil section 21.

The power receiving device 30 includes a power receiving coil section 31, a matching circuit 32, a rectifying circuit (detecting circuit) 33, and a load 34 such as a battery, an LED or the like as a destination of supply of the power received.

The power receiving coil section 31 includes a power receiving coil 311.

The power receiving coil 311 receives the AC power transmitted from the feeding device 20 while having coupling relation with the resonant coil 212 on the side of the feeding device 20.

The matching circuit 32 has a function of impedance matching at a load terminal of the power receiving coil 311 according to a control signal supplied from a controller not shown in the figure.

The rectifying circuit 33 rectifies the received alternating-current power into direct-current (DC) power, converts the supplied DC power into a DC voltage according to specifications of the electronic device as the supply destination in a voltage stabilizing circuit not shown in the figure, and supplies the stabilized DC voltage to the load 34 such as a battery, an LED or the like.

An example of constitution of the power transmitting and receiving coils will be described in the following with reference to FIG. 2.

The present wireless feeding system 10 has only one resonant coil, that is, the resonant coil 212 on the power transmitting side.

The feeding coil 211 and the resonant coil 212 on the power transmitting side are coupled to each other by electromagnetic induction.

Further, the resonant coil 212 and the power receiving coil 311 on the power receiving side are coupled to each other to supply power to the load 34.

The feeding coil 211 and the resonant coil 212 on the power transmitting side are integrated with each other as power transmitting (feeding) device, whereby a constitution including only the power receiving coil 311 and the matching circuit 32 can be adopted on the power receiving side. Thus, the power receiving device 30 can be miniaturized and simplified.

An outline of overall operation of the present wireless feeding system 10 will next be described.

For AC power generated in the high-frequency power generating section 24, the matching circuit 23 makes impedance adjustment (matching) at the feeding point of the feeding coil of the power transmitting coil section 21.

The frequency characteristic correcting circuit 22 achieves a wider band of a frequency characteristic while maintaining a high Q-value. The frequency characteristic correcting circuit 22 is coupled to the feeding coil 211 of the power transmitting coil section 21.

The power whose frequency characteristic is thus expanded into a wider band is fed to the feeding coil 211, and transmitted to the resonant coil 212 for transmission via the feeding coil 211 by coupling due to electromagnetic induction.

The power supplied to the resonant coil 212 for transmission is supplied to the rectifying circuit 33 via the power receiving coil 311 connected to the matching circuit 32 at a frequency determined by the resonant coil 212.

The rectifying circuit 33 converts the AC power into DC power, thereafter converts the DC power into a DC voltage according to the specifications of the electronic device as the supply destination in a voltage stabilizing circuit not shown in the figure, and supplies the stabilized DC voltage to the load 34 such as a battery, an LED or the like.

Incidentally, the frequency determined by the resonant coil 212 on the power transmitting side may be changed depending on the system being used. However, the power receiving coil 311 in the present system 10 does not resonate.

Thus, adjustment of strength of coupling which strength changes according to a distance between the resonant coil 212 on the power transmitting side and the power receiving coil 311 and impedance matching in the matching circuit 32 enable the power receiving side to be used even in combination with a power transmitting coil with a different resonance frequency.

That is, in the wireless feeding system 10 according to the present embodiment, the frequency is determined by the resonant coil 212 for transmission.

A transmission characteristic can be adjusted by the strength of coupling which strength changes according to the distance D between the resonant coil 212 on the power transmitting side and the power receiving coil 311 and the impedance adjustment in the matching circuit 32 on the power receiving side.

In the following, for reference, the impedance characteristic of the power receiving coil will be considered.

Figure 6:
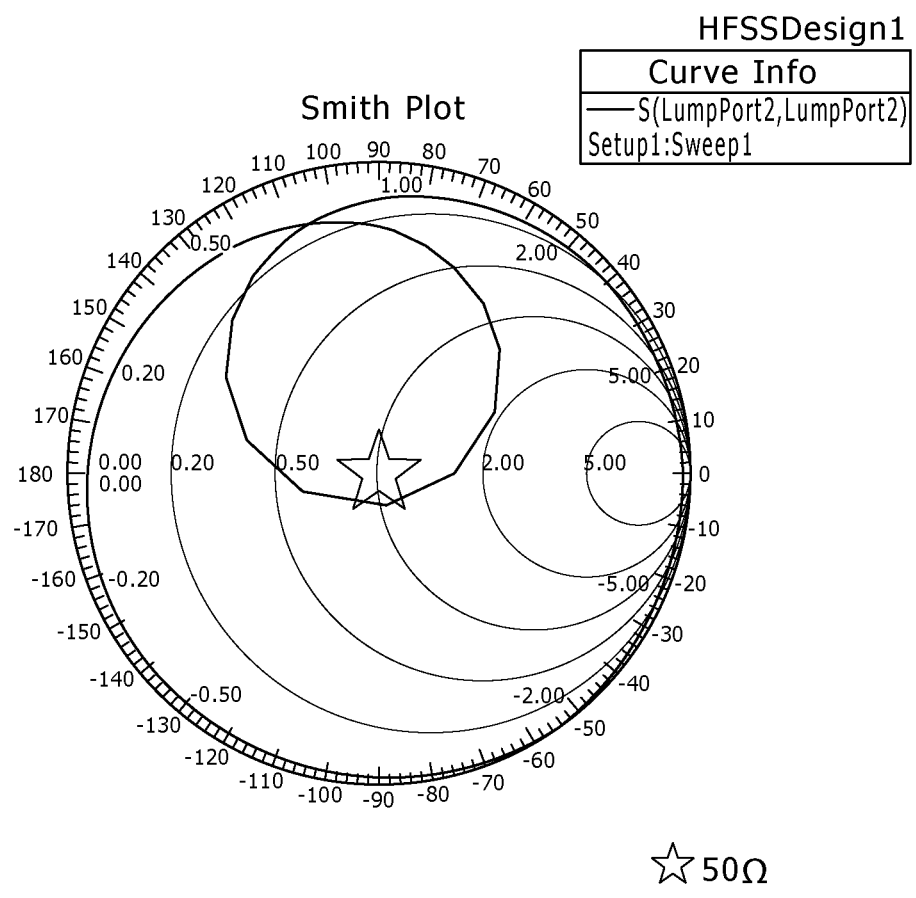
FIG. 6 is a Smith chart showing the impedance characteristic of the power receiving coil to which a matching circuit according to the present embodiment is connected.

FIG. 6 is a Smith chart showing the impedance characteristic of the power receiving coil to which the matching circuit according to the present embodiment is connected.

Figure 7:
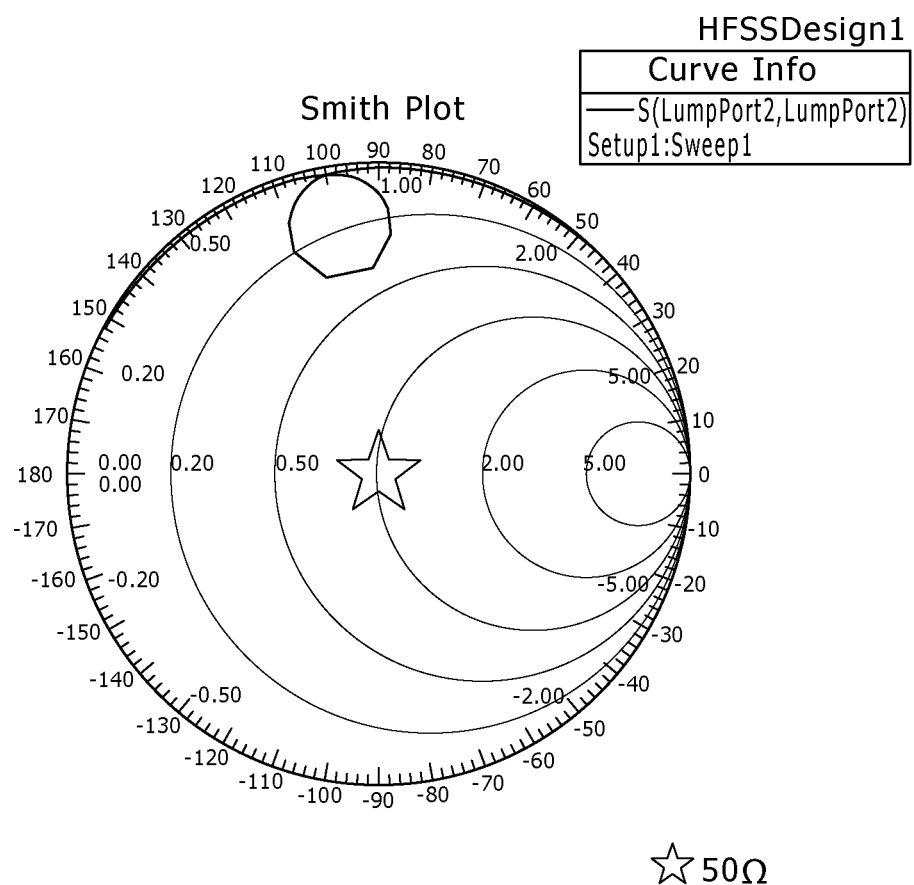
FIG. 7 is a Smith chart showing the impedance characteristic of the power receiving coil without the matching circuit as a comparative example.

FIG. 7 is a Smith chart showing the impedance characteristic of the power receiving coil without the matching circuit as a comparative example.

Because the power receiving coil 311 has a small number of turns and a small structure, the power receiving coil 311 has a small inductance value and a small capacitance value, and therefore has low impedance.

Thus, when no matching circuit is provided as in the comparative example, impedance is not matched to the load 34 on the power receiving side, and a transmission loss is increased. The constitution without the matching circuit cannot be used efficiently as it is, as shown in FIG. 7.

On the other hand, by adding the matching circuit 32 between the power receiving coil 311 and the load 34 as in the present embodiment, as shown in FIG. 6, impedance matching to the load is achieved, and transmission efficiency is enhanced.

Consideration will next be given to the transmission loss characteristic of the wireless feeding system according to the present embodiment.

The transmission loss characteristics of a magnetic field resonance type wireless feeding system and an electromagnetic induction type wireless feeding system will be shown in the following as a comparative example.

Figures 8, 9:
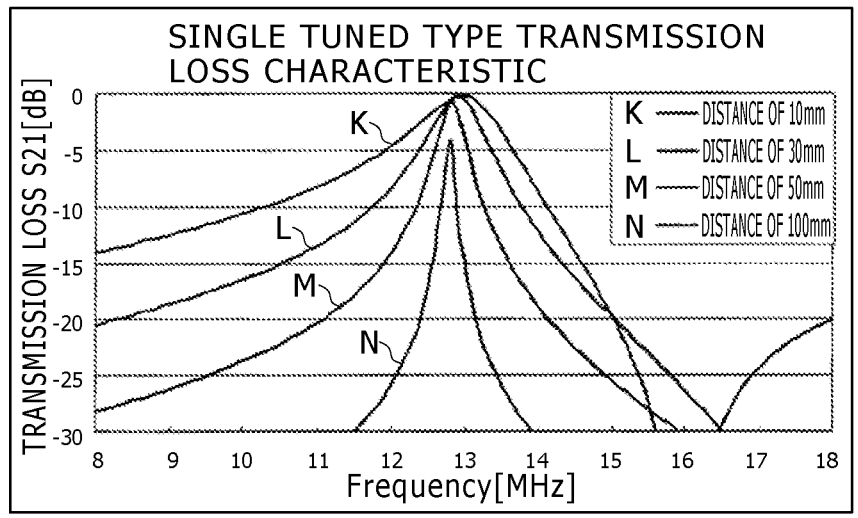
FIG. 8 is a characteristic diagram showing the transmission loss characteristic of the wireless feeding system according to the present embodiment.
FIG. 9 is a diagram showing relations between the transmission distance, transmission loss, and frequency of the wireless feeding system according to the present embodiment in association with each other.

FIG. 8 is a characteristic diagram showing the transmission loss characteristic of the wireless feeding system according to the present embodiment.

FIG. 9 is a diagram showing relations between the transmission distance, transmission loss, and frequency of the wireless feeding system according to the present embodiment in association with each other.

Figure 10:
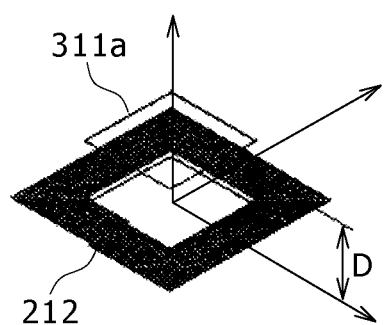
FIG. 10 is a diagram schematically showing power transmitting and receiving coils of the wireless feeding system according to the present embodiment.

FIG. 10 is a diagram schematically showing power transmitting and receiving coils of the wireless feeding system according to the present embodiment.

In FIG. 10, corresponding relation between a resonant coil 212 and a power receiving loop coil 311a is shown.

In this example, the number of turns of the resonant coil 212 is 14, and the resonant coil 212 is formed in a rectangular shape having one side 170 mm long.

The number of turns of the power receiving loop coil 311a is 1, and the power receiving loop coil 311a is formed in a rectangular shape having one side 90 mm long.

The resonant coil 212 and the power receiving loop coil 311a both have a wire diameter of 1 mm.

A distance between the resonant coil 212 and the power receiving loop coil 311a is the transmission distance D.

In FIG. 8, an axis of abscissas indicates the frequency, and an axis of ordinates indicates the transmission loss.

In FIG. 8, a curve indicated by K represents a transmission loss characteristic when the transmission distance D is 10 mm, and a curve indicated by L represents a transmission loss characteristic when the transmission distance D is 30 mm.

In FIG. 8, a curve indicated by M represents a transmission loss characteristic when the transmission distance D is 50 mm, and a curve indicated by N represents a transmission loss characteristic when the transmission distance D is 100 mm.

In the wireless feeding system 10 according to the present embodiment, as shown in FIG. 8 and FIG. 9, when the transmission distance D is 10 mm, the transmission loss is −0.22 [dB], and the resonance frequency is 13.0 [MHz].

When the transmission distance D is 30 mm, the transmission loss is −0.26 [dB], and the resonance frequency is 12.9 [MHz].

When the transmission distance D is 50 mm, the transmission loss is −0.64 [dB], and the resonance frequency is 12.8 [MHz].

When the transmission distance D is 100 mm, the transmission loss is −4.13 [dB], and the resonance frequency is 12.8 [MHz].

Thus, in the wireless feeding system 10 according to the present embodiment, even when the transmission distance D is reduced, the frequency characteristic of the resonant coil 212 is not changed, and thus no degradation in transmission characteristic occurs.

Figures 11, 12:
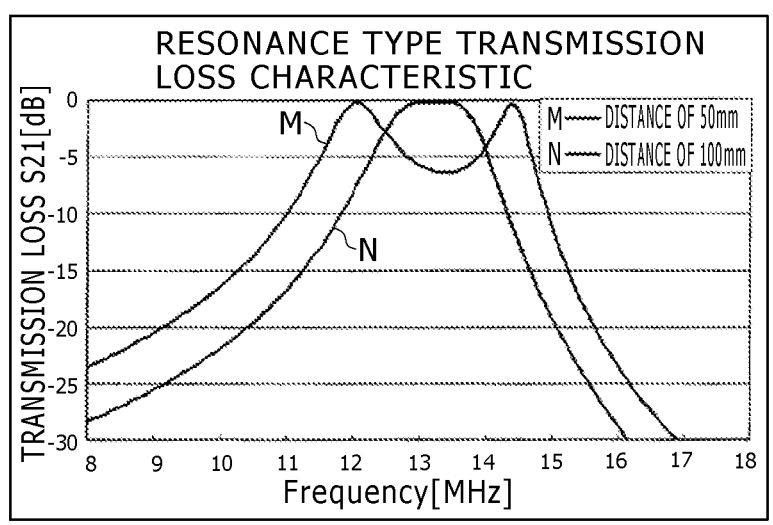
FIG. 11 is a characteristic diagram showing the transmission loss characteristic of a resonance type wireless feeding system as a comparative example.
FIG. 12 is a diagram showing relations between the transmission distance, transmission loss, and frequency of the resonance type wireless feeding system as a comparative example in association with each other.

FIG. 11 is a characteristic diagram showing the transmission loss characteristic of a resonance type wireless feeding system as a comparative example.

FIG. 12 is a diagram showing relations between the transmission distance, transmission loss, and frequency of the resonance type wireless feeding system as a comparative example in association with each other.

Figure 13:
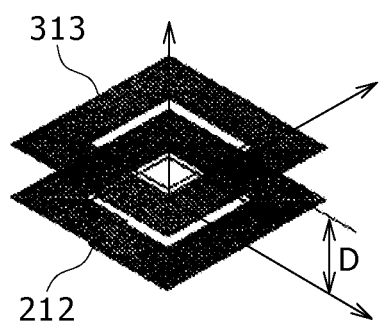
FIG. 13 is a diagram schematically showing power transmitting and receiving coils of the resonance type wireless feeding system as a comparative example.

FIG. 13 is a diagram schematically showing power transmitting and receiving coils of the resonance type wireless feeding system as a comparative example.

In FIG. 13, corresponding relation between a power transmitting side resonant coil 212 and a power receiving side resonant coil 313 is shown.

In this example, the number of turns of the power transmitting side resonant coil 212 and the number of turns of the power receiving side resonant coil 313 are both 14, and the power transmitting side resonant coil 212 and the power receiving side resonant coil 313 are formed in a rectangular shape having one side 170 mm long.

The power transmitting side resonant coil 212 and the power receiving side resonant coil 313 both have a wire diameter of 1 mm.

A distance between the power transmitting side resonant coil 212 and the power receiving side resonant coil 313 is the transmission distance D.

In FIG. 11, an axis of abscissas indicates the frequency, and an axis of ordinates indicates the transmission loss.

In FIG. 11, a curve indicated by M represents a transmission loss characteristic when the transmission distance D is 50 mm, and a curve indicated by N represents a transmission loss characteristic when the transmission distance D is 100 mm.

In the resonance type wireless feeding system, as shown in FIG. 11 and FIG. 12, when the transmission distance D is 100 mm, the transmission loss is −0.21 [dB], and the resonance frequency is 13.4 [MHz].

When the transmission distance D is 50 mm, the transmission loss is −6.45 [dB], and the resonance frequency is 13.4 [MHz].

Thus, in the resonance type wireless feeding system, when the transmission distance D is reduced, the frequency characteristic is changed, and the transmission characteristic is degraded in a usable frequency band instead.

Figures 14, 15:
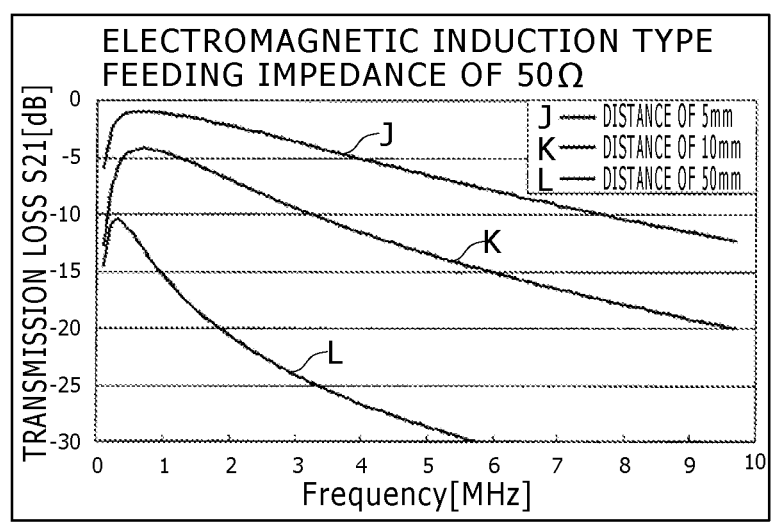
FIG. 14 is a characteristic diagram showing the transmission loss characteristic of an electromagnetic induction type wireless feeding system as a comparative example.
FIG. 15 is a diagram showing relations between the transmission distance, transmission loss, and frequency of the electromagnetic induction type wireless feeding system as a comparative example in association with each other.

FIG. 14 is a characteristic diagram showing the transmission loss characteristic of an electromagnetic induction type wireless feeding system as a comparative example.

FIG. 15 is a diagram showing relations between the transmission distance, transmission loss, and frequency of the electromagnetic induction type wireless feeding system as a comparative example in association with each other.

Figure 16:
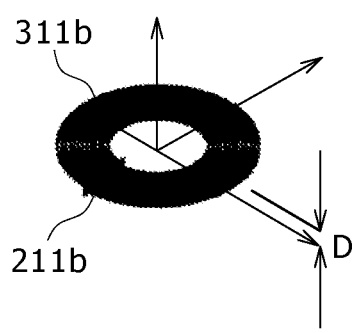
FIG. 16 is a diagram schematically showing power transmitting and receiving coils of the electromagnetic induction type wireless feeding system as a comparative example.

FIG. 16 is a diagram schematically showing power transmitting and receiving coils of the electromagnetic induction type wireless feeding system as a comparative example.

In FIG. 16, corresponding relation between a power transmitting side feeding coil (power transmitting coil) 211b and a power receiving side feeding coil (power receiving coil) 311b is shown.

A distance between the power transmitting side feeding coil 211b and the power receiving side feeding coil 311b is the transmission distance D.

In FIG. 14, an axis of abscissas indicates the frequency, and an axis of ordinates indicates the transmission loss.

In FIG. 14, a curve indicated by J represents a transmission loss characteristic when the transmission distance D is 5 mm, a curve indicated by K represents a transmission loss characteristic when the transmission distance D is 10 mm, and a curve indicated by L represents a transmission loss characteristic when the transmission distance D is 50 mm.

In the electromagnetic induction type wireless feeding system, as shown in FIG. 14 and FIG. 15, when the transmission distance D is 5 mm, the transmission loss is −0.99 [dB], and the resonance frequency is 0.7 [MHz].

When the transmission distance D is 10 mm, the transmission loss is −4.22 [dB], and the resonance frequency is 0.7 [MHz].

When the transmission distance D is 50 mm, the transmission loss is −10.40 [dB], and the resonance frequency is 0.3 [MHz].

Thus, in the electromagnetic induction type wireless feeding system, when the transmission distance D is increased, the frequency characteristic is degraded.

That is, the electromagnetic induction type wireless feeding system has a transmission distance of a few mm.

On the other hand, the wireless feeding system 10 according to the present embodiment has a longer transmission distance than the electromagnetic induction type. Thus, the wireless feeding system 10 according to the present embodiment provides a degree of freedom of installation, and is suitable for feeding and charging of a small device.

In addition, as described above, the wireless feeding system 10 according to the present embodiment is free from the problem of the frequency characteristic being changed and the transmission characteristic being degraded instead when the transmission distance is reduced as in the case of the resonance type.

That is, in the wireless feeding system 10 according to the present embodiment, even when the transmission distance is reduced, the frequency characteristic of the resonant coil is not changed, and therefore the transmission characteristic is not degraded.

The wireless feeding system 10 according to the present embodiment has the frequency characteristic correcting circuit 22 that achieves a wider band by expanding the frequency characteristic while maintaining a high Q-value of the power to be transmitted which power is supplied through the matching circuit 23, and which circuit is coupled to the feeding coil 211 of the power transmitting coil section 21.

The present embodiment can therefore provide the following effects.

It is possible to achieve a wider band while maintaining high performance (Q-value) of a resonator necessary to realize a long transmission distance of a resonator coupling type.

Transmission efficiency is not lowered even when the frequency of a carrier is shifted. Thus, a low frequency accuracy suffices for the oscillator within the feeding device (transmitter). In addition, susceptibility to variations in oscillation frequency due to temperature changes or power supply variations is eliminated.

The resonance frequency of a resonator changes depending on an ambient environment and variations in parameters of a connected circuit. However, a robust system resistant to these parameter variations is obtained because of the wide band.

In power transmission, high power incomparable to that of communication is handled. At the time of the power transmission, a communicating terminal and a receiver in the vicinity are not to be disturbed. If disturbance is likely to be caused by interference, a measure such as swiftly changing to a difference frequency becomes necessary. In that case, because the present embodiment has a wide-band transmission characteristic, the transmitting section including the resonator does not need to be changed even when the carrier frequency is to be changed. It is thus possible to deal with the interference easily while maintaining a high degree of characteristic.

Also in resonator coupling type power transmission, data can be superimposed by modulating a carrier. However, to send data at a high rate without impairing noise immunity needs a correspondingly wide band. The present embodiment is of the resonator coupling type but has a wide band, thus enabling high-speed data superimposition to be performed easily.

In a case where data communication is performed, the communication can be performed by modulating a carrier for power transmission. However, performing the communication and power transmission simultaneously involves an inconvenience because there is a difference in necessary and sufficient transmission power. Thus, while there is a case where communication and power transmission are desired to be performed at different frequencies, an existing system with a narrow band cannot perform communication and power transmission at different frequencies unless a separate antenna is provided. On the other hand, when the embodiment of the present disclosure is used, a wider band of the transmitting section can be achieved, and thus communication can be performed simultaneously at a different frequency from a frequency for power transmission.

In addition, the frequency characteristic correcting circuit can be formed with either of a lumped constant and a distributed constant.

The frequency characteristic correcting circuit is susceptible of various modifications, and an appropriate circuit can be used according to conditions. Incidentally, the frequency characteristic correcting circuit can be disposed on only the side of the receiving device (not shown), or can be disposed in both of the transmitting device and the receiving device (not shown).

Increasing the number of resonator stages makes it possible to achieve an even wider band and suppress spurious emission.

2. Second Embodiment

Figure 17:
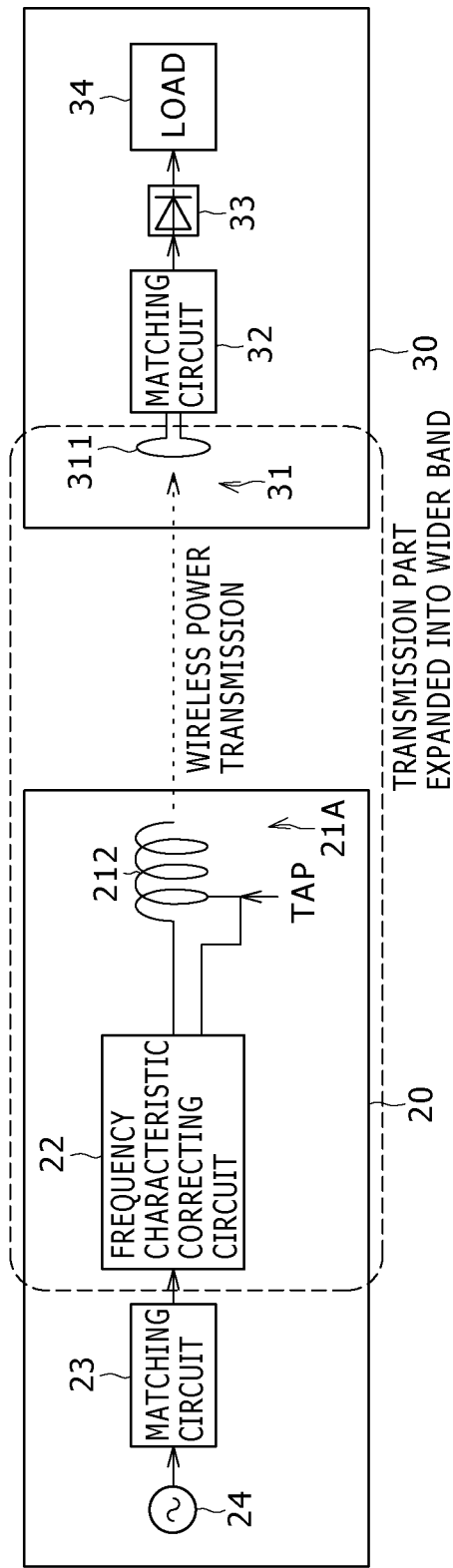
FIG. 17 is a block diagram showing an example of configuration of a wireless feeding system according to a second embodiment of the present disclosure.

FIG. 17 is a block diagram showing an example of configuration of a wireless feeding system according to a second embodiment of the present disclosure.

The wireless feeding system 10A according to the present second embodiment is different from the wireless feeding system 10 according to the first embodiment in that one terminal part of a frequency characteristic correcting circuit 22 in the wireless feeding system 10A is connected to a resonant coil 212 by a tap without a feeding coil 211 being used.

The constitution of the second embodiment is otherwise similar to that of the first embodiment.

The present second embodiment can provide similar effects to the effects of the foregoing first embodiment.

3. Third Embodiment

Figure 18:
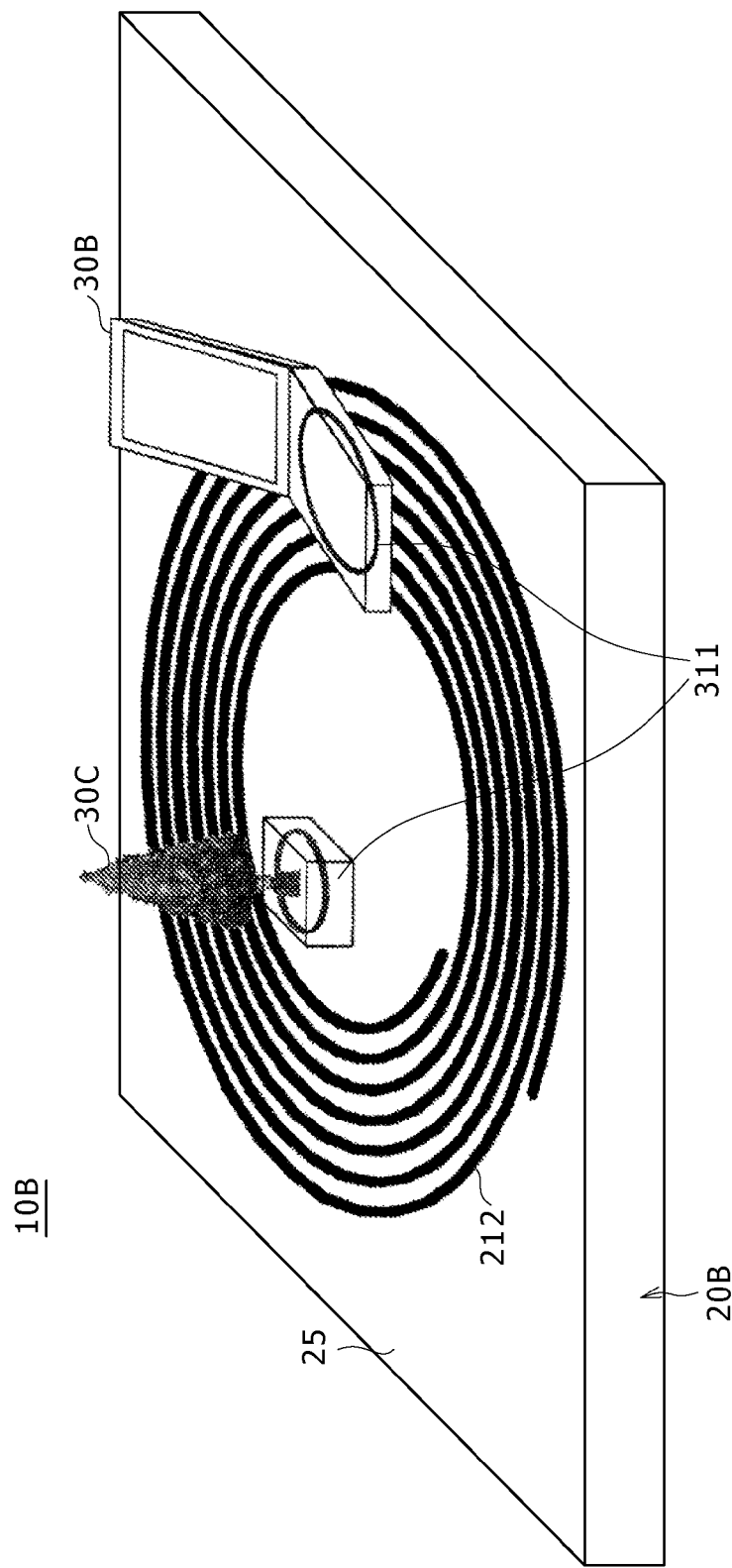
FIG. 18 is a diagram showing an example of application of a wireless feeding system according to an embodiment of the present disclosure.

FIG. 18 is a diagram showing an example of application of a wireless feeding system according to an embodiment of the present disclosure.

In this example of application, a feeding device (power transmitting device) 20B is formed as a device in the shape of a rectangular parallelepiped, for example, which device is mountable on a table or the like.

In FIG. 18, a small device 30B such as a portable terminal or the like and an illumination object 30C are illustrated as power receiving devices.

The small device 30B and the illumination object 30C include a power receiving loop coil 311.

Power is transmitted from a resonant coil 212 included in a feeding device 20B to the small device 30B and the illumination object 30C placed on a principal surface 25 of the feeding device 20B or in proximity to the principal surface 25 of the feeding device 20B at a distance of a few ten mm. The power can be used to charge the small device 30B and feed the illumination object 30C and the like.

The wireless feeding system 10B provides a degree of freedom for alignment as with a resonance type, and can feed a plurality of devices simultaneously and in parallel with each other.

As described above, the wireless feeding system according to the present embodiment can provide the following effects.

That is, according to the present embodiment, a single resonant coil suffices. Thus, a power receiving device can be formed by only a simple loop coil and a matching circuit on a power receiving side, so that miniaturization can be achieved on the power receiving side.

Because resonance frequency does not change even at a short distance, power feeding can be performed efficiently without a frequency adjusting circuit or the like, so that the constitution is simplified.

A precise alignment as in electromagnetic induction is not demanded, so that a high degree of usability is provided for the user.

Even a power transmitting coil with a different resonance frequency can be used in combination by adjusting a distance and a matching circuit on the power receiving side.

The wireless feeding system according to the present embodiment has the frequency characteristic correcting circuit that achieves a wider band by expanding a frequency characteristic while maintaining a high Q-value of the power to be transmitted which power is supplied through the matching circuit, and which circuit is coupled to the feeding coil of the power transmitting coil section.

The present embodiment can therefore provide the following effects.

It is possible to achieve a wider band while maintaining high performance (Q-value) of a resonator necessary to realize a long transmission distance of a resonator coupling type.

Transmission efficiency is not lowered even when the frequency of a carrier is shifted. Thus, a low frequency accuracy suffices for the oscillator within the feeding device (transmitter). In addition, susceptibility to variations in oscillation frequency due to temperature changes or power supply variations is eliminated.

The present disclosure contains subject matter related to that disclosed in Japanese Priority Patent Application JP 2010-172003 filed in the Japan Patent Office on Jul. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless feeding system comprising:
a feeding device; and
a power receiving device configured to receive power transmitted from the feeding device,
wherein,
(1) the feeding device includes
(a) a power generating section configured to generate the power to be fed,
(b) a resonant element fed with the power generated by the power generating section and configured to transmit the power to the power receiving device, and
(c) a frequency characteristic correcting circuit separate from the resonant element and coupled on a power propagation path between the power generating section and the resonant element, the frequency characteristic circuit including (i) a first resonant circuit configured to perform frequency characteristic correction and (ii) a second resonant circuit configured to perform feeding, the first resonant circuit and the second resonant circuit being coupled to each other via a common inductance or a common capacitance, and
(2) the power receiving device includes a power receiving element configured to receive the power transmitted from the feeding device, and to supply the received power to a load,
wherein,
the first resonant circuit of the frequency characteristic circuit comprises a first inductor and a first capacitor, the first inductor being connected directly between a first node and a second node, the first capacitor being connected directly between a third node and a fourth node, the first, second, third, and fourth nodes being separate from each other,
the second resonant circuit comprises a second inductor and a second capacitor that are separate from the first inductor and the first capacitor of the first resonant circuit, the second inductor being connected directly between the second node and a fifth node, the second capacitor being connected directly between the fourth node and a sixth node, the fifth and sixth nodes being separate from each other and from the first, second, third, and fourth nodes, and
the common inductance or the common capacitance is connected directly between the second node and the fourth node.

2. The wireless feeding system according to claim 1, wherein the feeding device further includes a feeding element coupled between the frequency characteristic correcting circuit and the resonant element, the feeding element coupled to the resonant element by electromagnetic induction.

3. The wireless feeding system according to claim 1, wherein the feeding device further includes a matching section configured to provide impedance matching at a feeding point of the power generated by the power generating section.

4. The wireless feeding system according to claim 1, wherein the power receiving device further includes a matching section between the power receiving element and the load, and configured to provide impedance matching to the load.

5. The wireless feeding system according to claim 4, wherein:
the resonant element on a transmitting side and the power receiving element on a receiving side are disposed within a given distance from each other, the given distance being in accordance with a desired strength of coupling between the resonant element and the power receiving element, and the matching section is configured to provide an impedance adjustment on the power receiving side.

6. The wireless feeding system according to claim 5, wherein the resonant element on the transmitting side is a single multi-turn loop coil and the power receiving element on the power receiving side is a single single-turn loop coil.

7. The wireless feeding system according to claim 1, wherein the first resonant circuit and the second resonant circuit are coupled to each other via the common inductance.

8. The wireless feeding system according to claim 1, wherein the first resonant circuit and the second resonant circuit are coupled to each other via the common capacitance.

\* \* \* \* \*